Dec. 16, 1947.  C. H. JORGENSEN ET AL  2,432,903
ENGINE CONTROLLER
Filed April 17, 1943  9 Sheets-Sheet 9
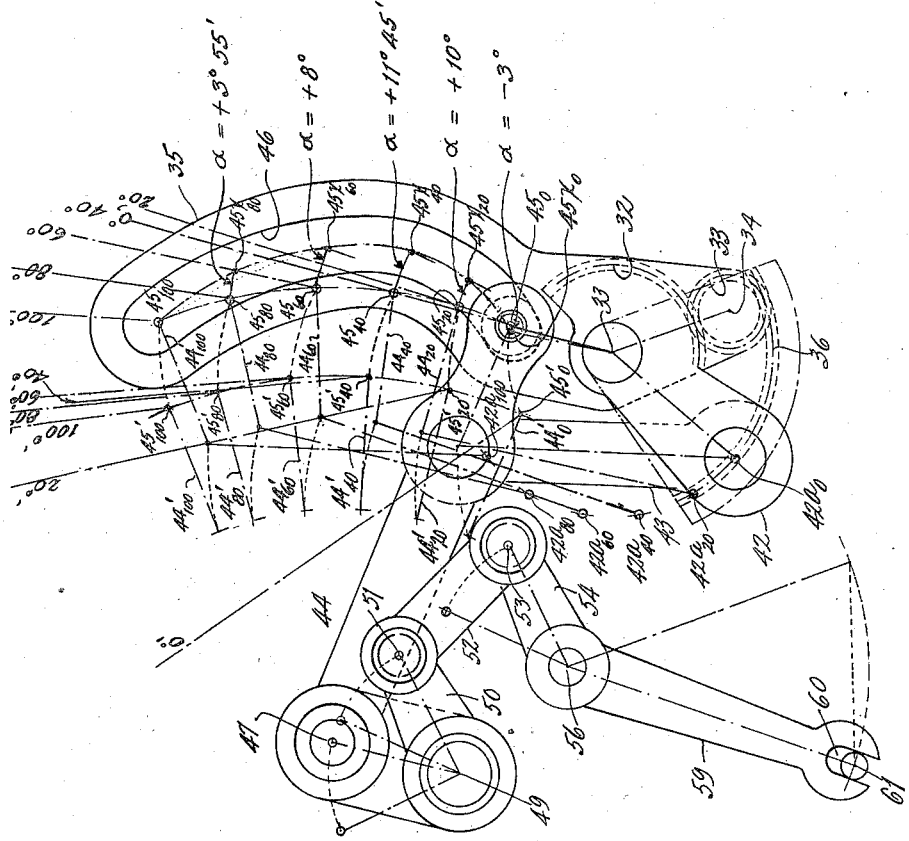
Fig. 12
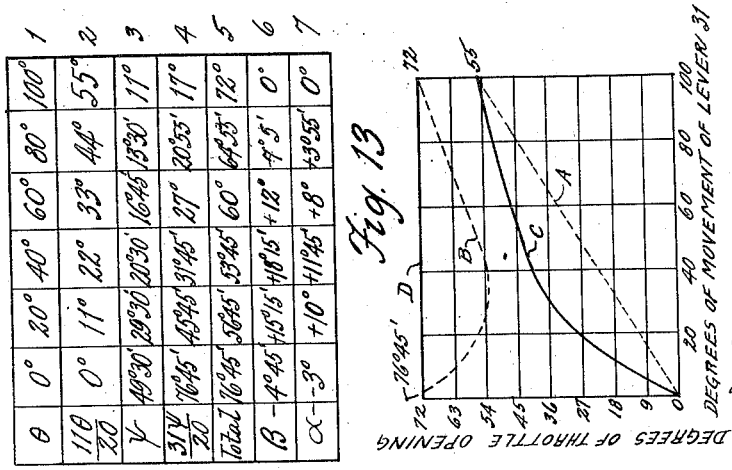
Fig. 13
Fig. 14
Inventors
Clarence H. Jorgensen
and
Lawrence C. Dermond
by
Spencer Hardman Febr
their attorneys Patented Dec. 16, 1947

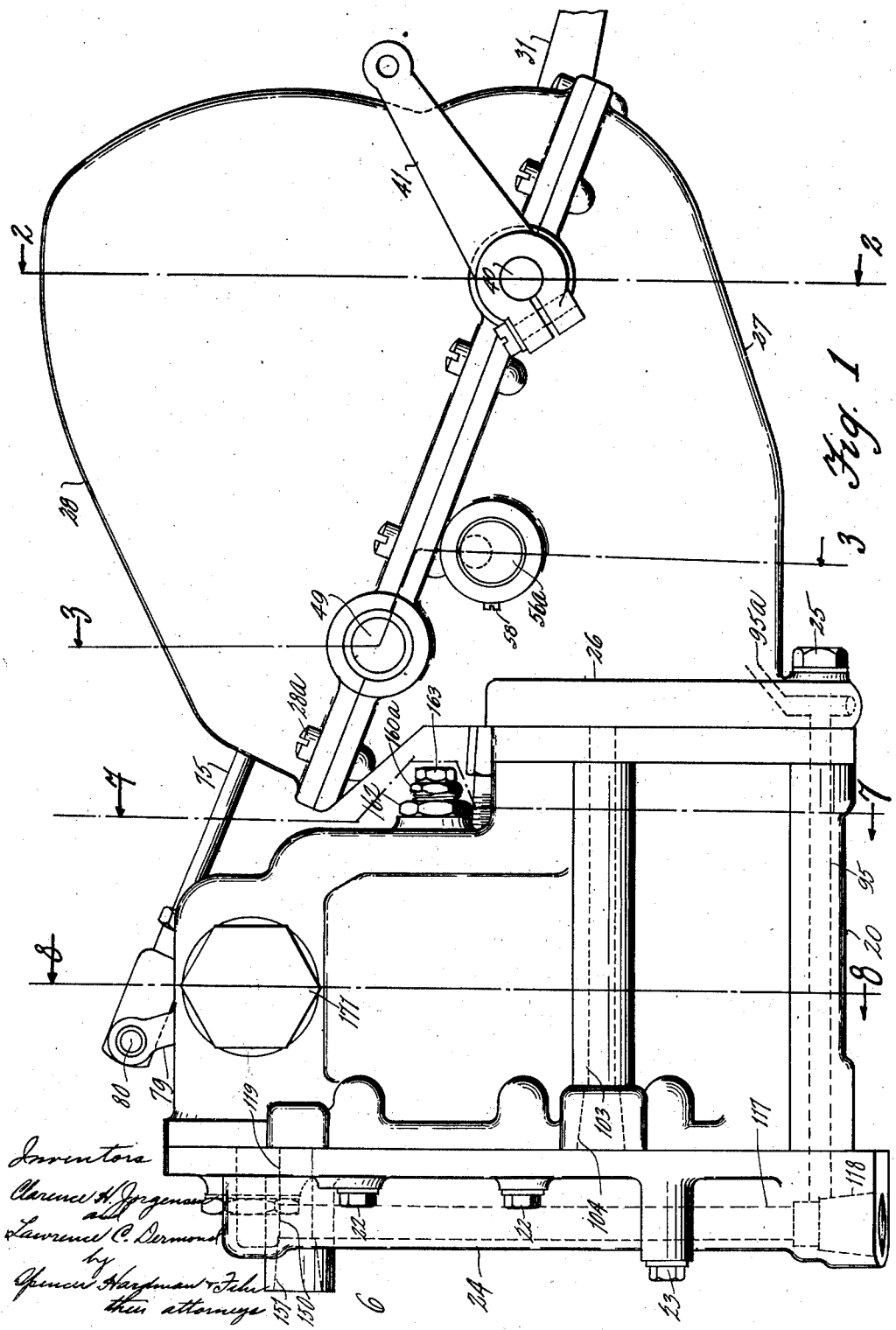

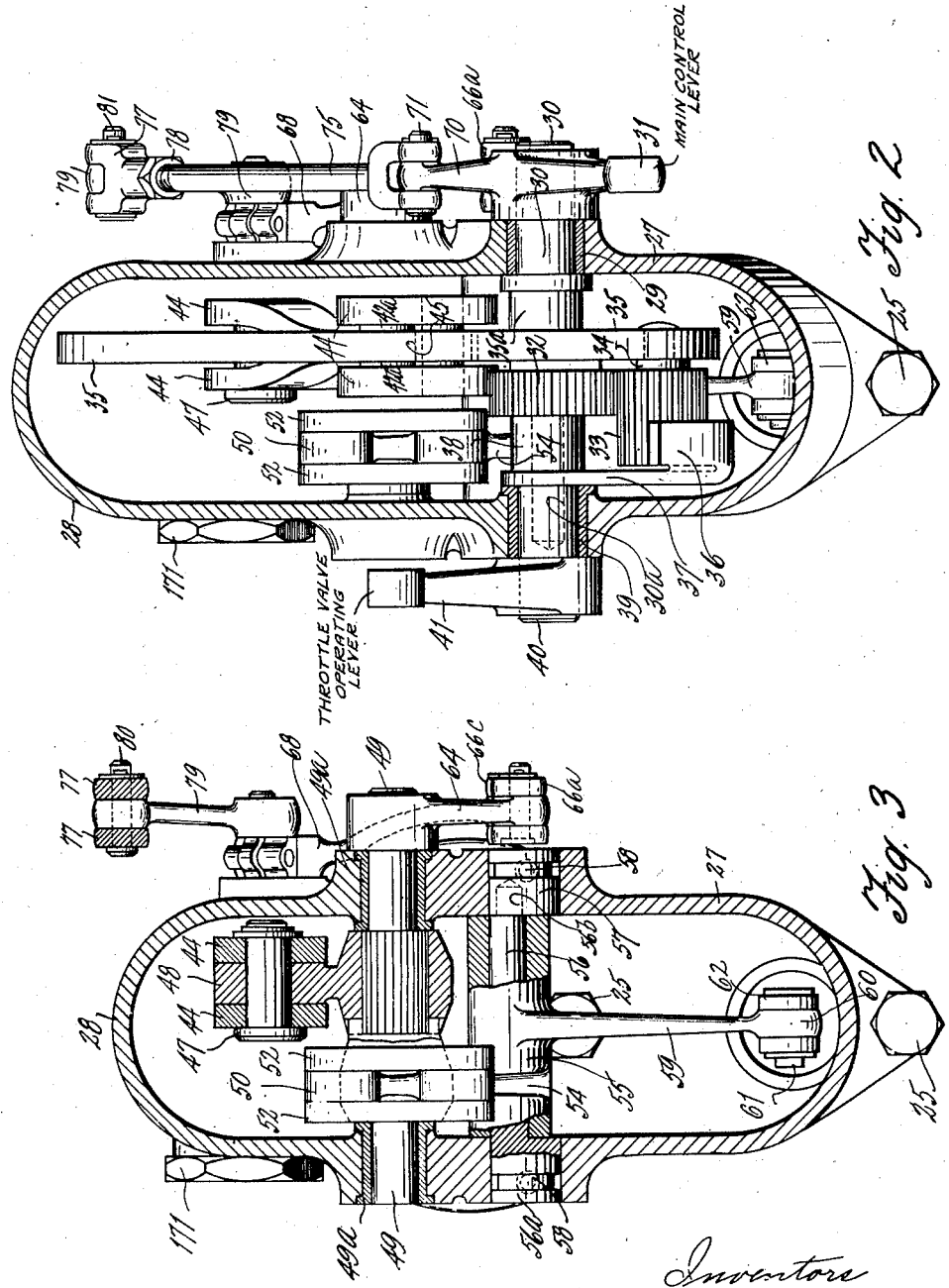

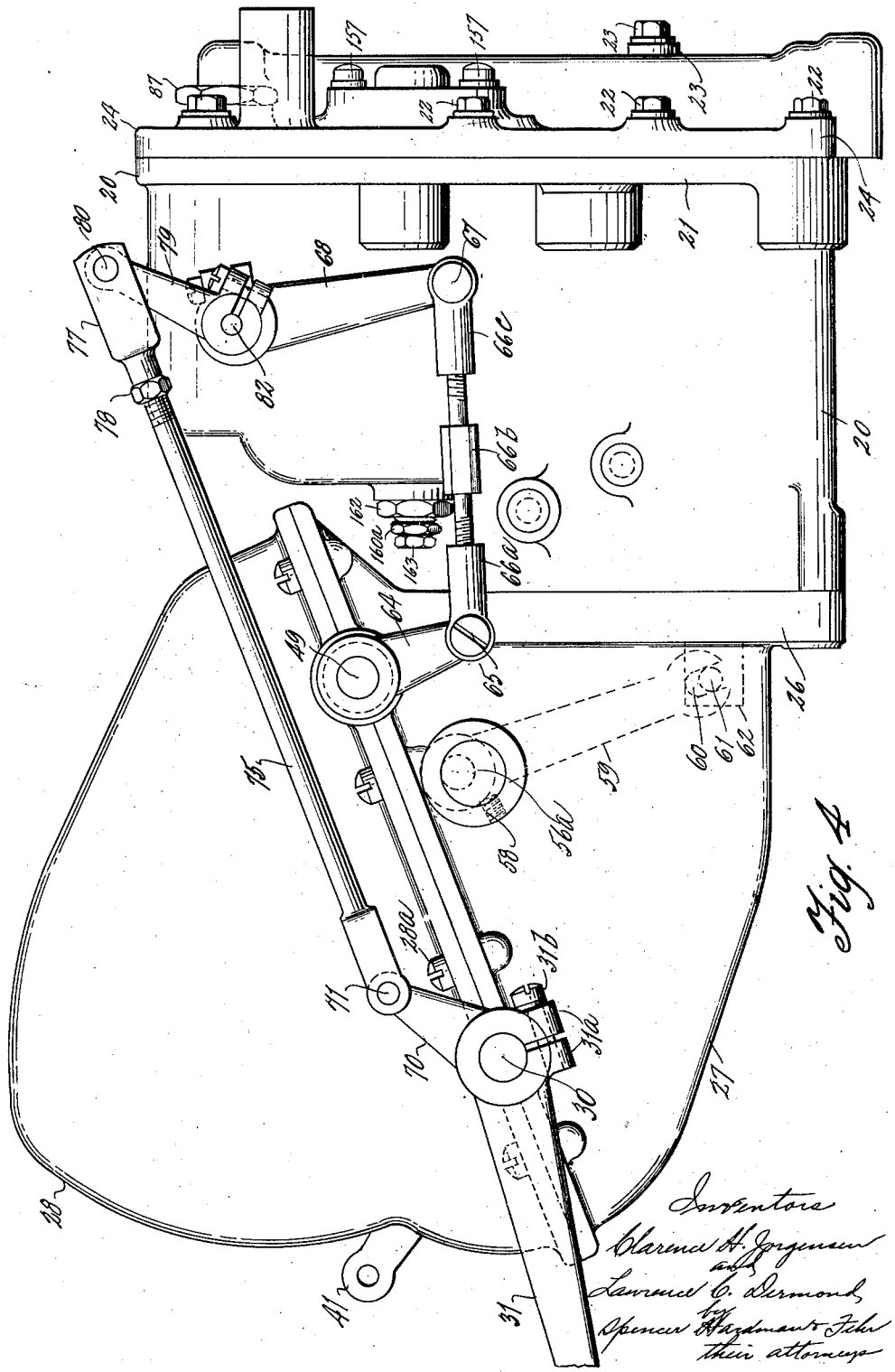

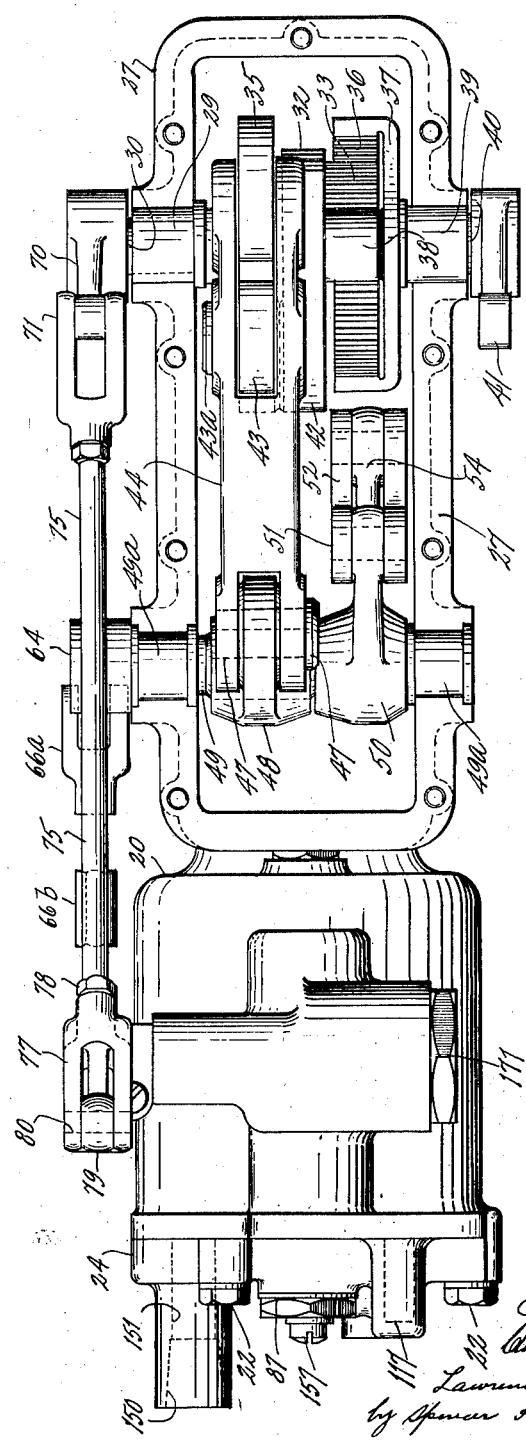

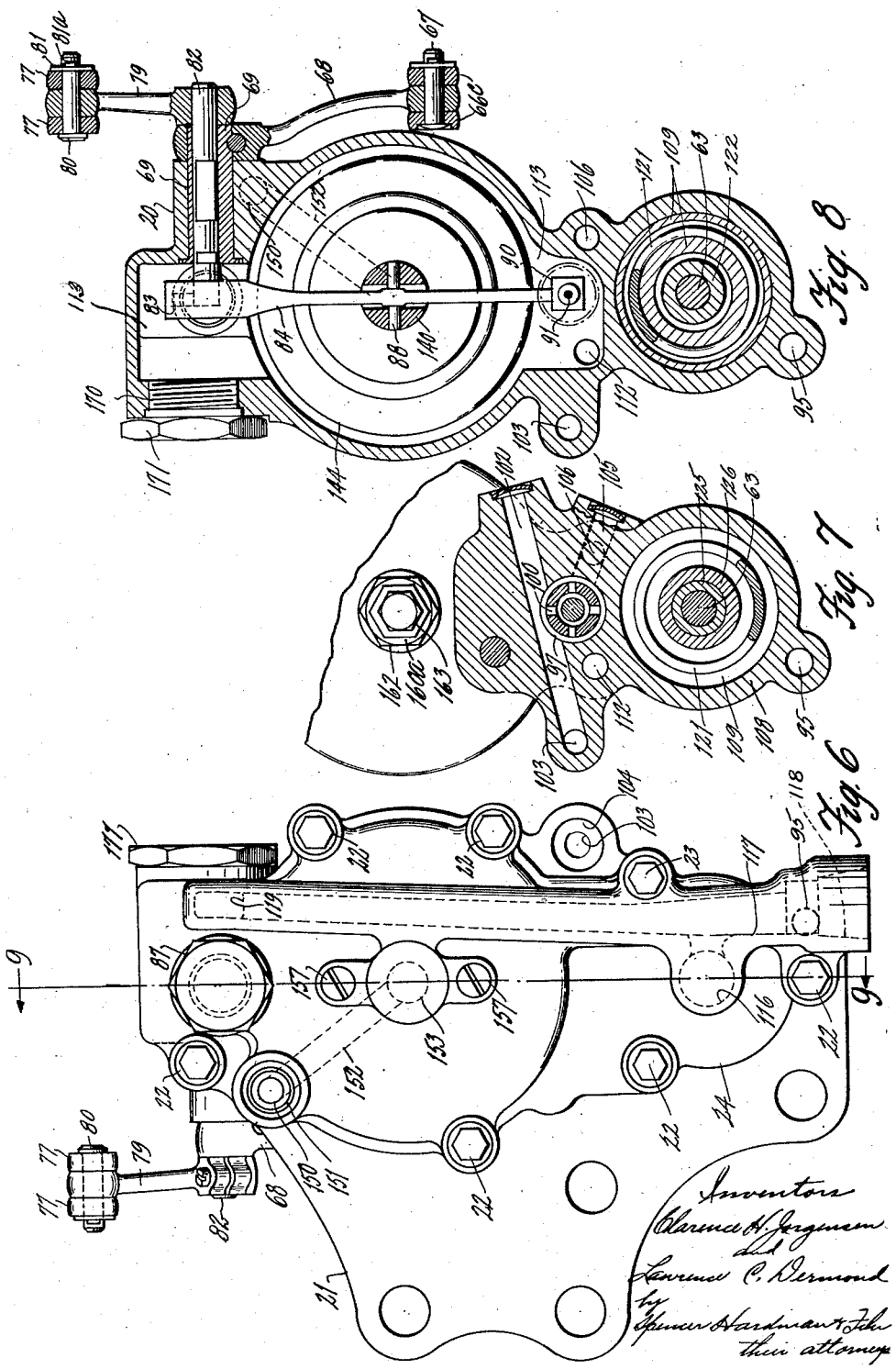

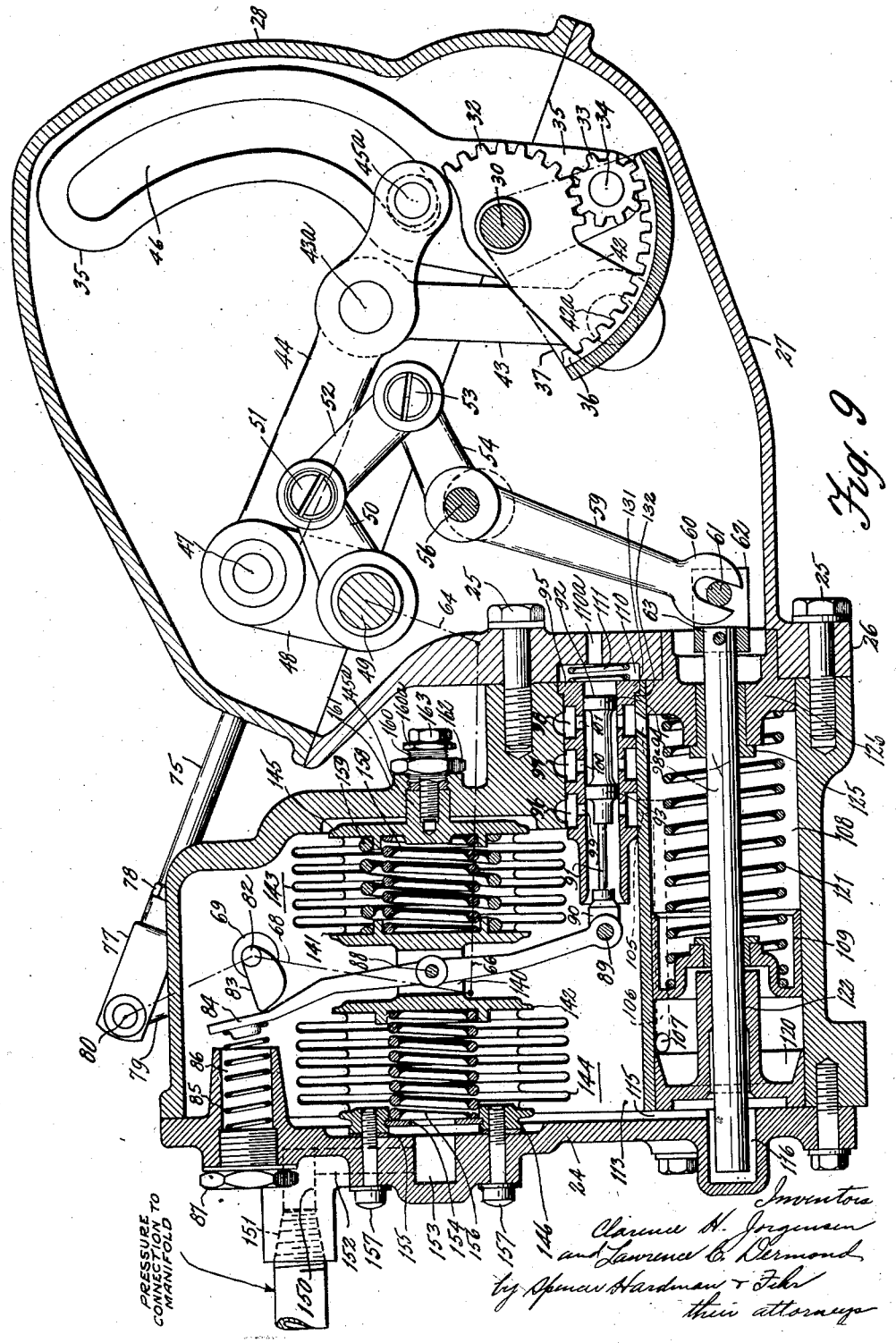

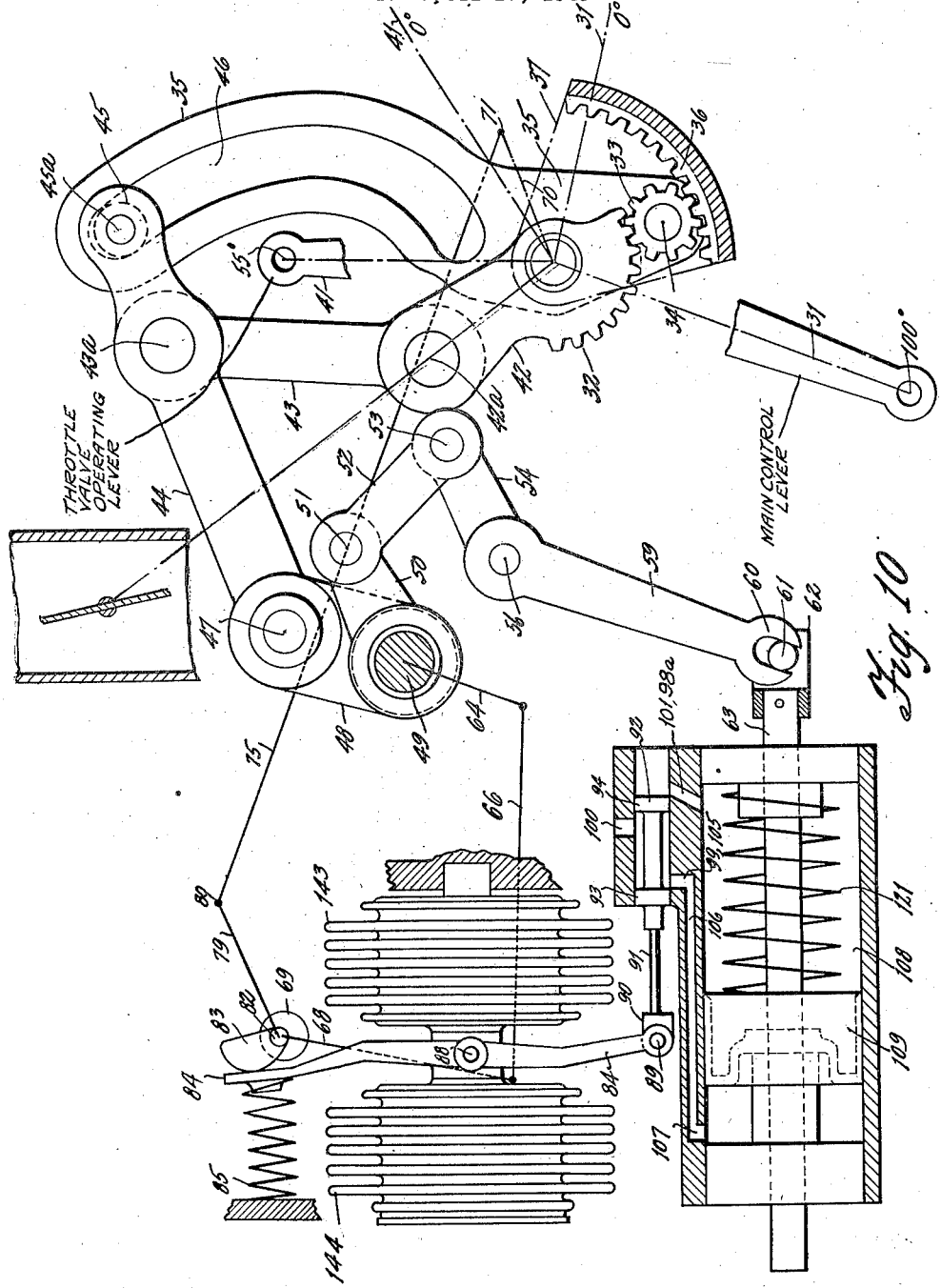

2,432,903

UNITED STATES PATENT OFFICE 2,432,903

ENGINE CONTROLLER

Clarence H. Jorgensen and Lawrence C. Dermond, Anderson, Ind., assignors to General Motors Corporation, Detroit, Mich., a corporation of Delaware Application April 17, 1943, Serial No. 483,439

11 Claims. (Cl. 123—103)

This invention relates to fuel intake pressure controllers for supercharged internal combustion engines used on airplanes. A type of pressure controller to which the present invention relates is disclosed in Dolza et al. application Serial No. 449,918, filed July 6, 1942. The controller of the Dolza application has a main control lever connected with the pilot's throttle control lever. The main control lever is manually operated to effect a certain amount of throttle opening approximating the opening required for take-off. The manually effected throttle opening is supplemented by automatically effected throttle opening to whatever position is required to maintain a predetermined fuel intake pressure with changing altitude. The automatic control of the throttle is effected by an hydraulic servo-motor having a control valve which is initially set by the manually operated main control lever for the purpose of selecting the fuel intake pressure to be maintained in predetermined relation to altitude and which is adjusted by means responsive to fuel intake pressure in order that the servo-motor will operate to the extent required for automatically moving the throttle valve to obtain the fuel intake pressure required to be maintained at a particular altitude. The extent of throttle opening obtained manually plus the extent of throttle opening obtained automatically gives wide open throttle position at critical altitude for a limited range of selection of high intake pressure such as required for take-off and emergency operation of the engine. For the range of pressure selections used in cruising, the throttle opening is less than wide open. For some makes of engine, the full opening of the throttle is not demanded for cruising purposes. However there are other engine makers who demand the regulator shall give wide open throttle at critical altitude, not only when the pressure selection is at high values specified for take-off and emergency, but also when the pressure selection is at lower values specified for cruising.

It is therefore an object of the present invention to provide a throttle valve controller so constructed and arranged as to provide a manual control of the throttle supplemented by an automatic control such that the total amount of throttle movement effected manually and automatically brings the throttle to the maximum open position at critical altitude throughout the entire range of pressure selections.

In the disclosed embodiment of the present invention this object is accomplished by means of a train of planetary gears of which the sun gear is driven by the main control lever, the ring gear drives the throttle shaft and the planet gear connecting the sun gear and ring gear is carried by a plate which is under the control of the main control lever and the piston of the hydraulic servo motor. The movements imparted by the lever and piston to the planet gear plate are such that, for every setting of the lever from zero to maximum pressure selection, the ring gear will be so moved as to give maximum opening of the throttle at critical altitude.

Further objects and advantages of the present invention will be apparent from the following description, reference being had to the accompanying drawings wherein a preferred embodiment of the present invention is clearly shown.

In the drawings:

Fig. 1 is a side view of a controller embodying the present invention.

Figs. 2 and 3 are sectional views taken respectively on lines 2—2 and 3—3 of Fig. 1.

Fig. 4 is a side view on the side opposite to Fig. 1.

Fig. 5 is a top view with the gear housing cover removed.

Fig. 6 is an end view taken in the direction of arrow 6 of Fig. 1.

Figure 11:
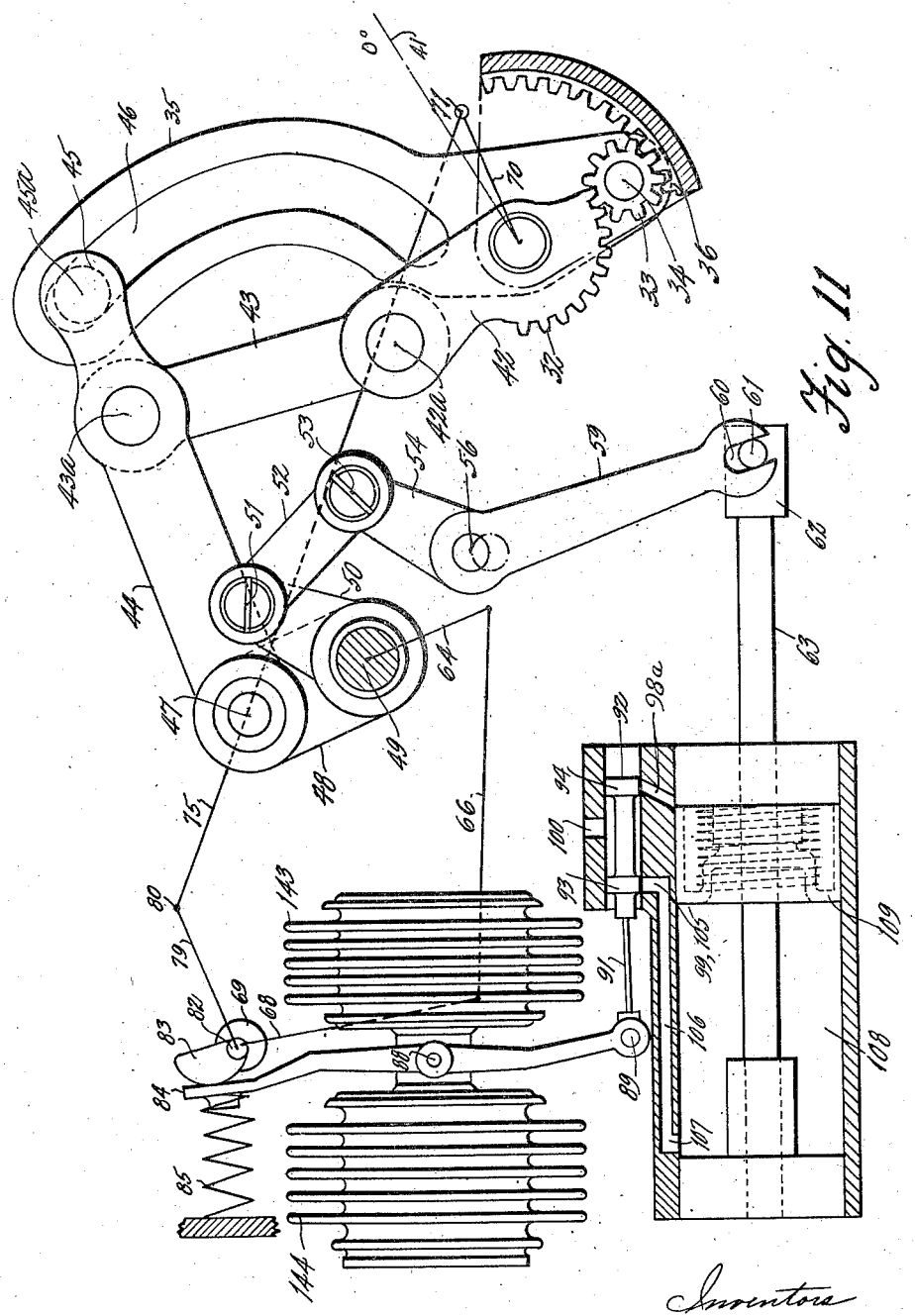

Figs. 7 and 8 are fragmentary sectional views taken, respectively, on lines 7—7 and 8—8 of Fig. 1.

Fig. 9 is a sectional view on line 9—9 of Fig. 6, and shows the operating parts in normal or rest position.

Fig. 10 is a diagram of the mechanism of Fig. 9 showing the parts in position after the main control lever 31 has been moved from 0° to 100° position but before the servo-motor has operated.

Fig. 11 is a diagram similar to Fig. 10 showing the position of the parts after the servo-motor has operated.

Fig. 12 is a diagram showing the manner of determining the contour of the slot 46 in the plate 35 which carries the planet gear 33.

Fig. 13 is a table of data and calculations used in connection with Fig. 12.

Fig. 14 is a chart showing the relation of movements of the main control lever and throttle.

Referring to Figs. 1 and 6, the controller comprises a housing 20 integral with a mounting bracket 21. Screws 22 and 23 secure to housing 20 a back plate 24. Screws 25 (Fig. 9) secure to housing 20 a bracket 26 integral with a housing 27 to which screws 28a secure a cover 28 (Fig.

1). Parts 27 and 28 confine a bearing 29 for a shaft 30 to which a main control lever 31 is attached. The left end portion 30a of shaft 30 is journalled in a central bore in a shaft 40. Shaft 30 drives a sun gear 32 meshing with a planet gear 33 journaled on a stud 34 carried by a plate 35 having a hub 35a loosely journalled on shaft 30. Gear 33 meshes with a ring gear 36 provided by a plate 37 having a hub 38 attached to shaft 40 journalled in a bearing 39 confined by housing 27 and its cover 28. Shaft 40 drives a throttle valve operating lever 41.

Referring to Fig. 9, gear 32 has an arm 42 connected by a pin 42a with a link 43 connected by a pin 43a with a floating link 44 carrying a stud 45a on which a roller 45 is journalled. Roller 45 is received by a cam slot 46 in the plate 35. Link 44 is connected by pin 47 with arm 48 connected with shaft 49. Shaft 49 is connected with an arm 50 connected by a pin 51 with a link 52 connected by a pin 53 with an arm 54 connected with an arm 59 journalled on a rod 56 and having a notched end 60 receiving a pin 61 carried by a block 62 on the end of the piston rod 63 of an hydraulic servo-motor to be described later. Referring to Fig. 3, the rod 56 has an eccentric head 56a and a reduced end 56b received by an eccentric plug 57. Head 56a and plug 57 can be rotated in aligned bearings in the side walls of housing 27 for the purpose of adjusting the position of rod 56. This adjustment is made for the purpose of properly coordinating the servo motor piston rod 63 with the planet gear 33.

Referring to Fig. 4, shaft 49 operates an arm 64 connected by screw-stud 65 with link 66 (having sections 66a and 66c and connecting turn buckle 66b) connected by screw stud 67 with arm 68 connected with shaft 69 journalled by housing 20 (Fig. 8). Lever 31 is integral with arm 70 connected by pin 71 with link 75 threaded into a clevis 77 and locked by a nut 78. A pin 80 connects clevis 77 with an arm 79 attached to a shaft 82 journalled in shaft 69 eccentrically of the axis thereof.

Shaft 82 supports and drives a cam 83 for selecting pressure to be maintained in a predetermined relation to altitude in the fuel intake passage of the engine. Cam 83 engages a lever 84 urged against the cam by a spring 85 located in a pocket 86 of plate 24 and retained by a plug 87. Intermediate its ends, the lever 84 is pivotally supported by pin 88 and is attached at its lower end by pin 89 to a clevis 90 attached by rod 91 to a valve 92 having lands 93 and 94 and slidable within a valve sleeve 95 having annular grooves 96, 97 and 98 communicating respectively with the interior of said sleeve by ports 99, 100, and 101. There are four each of the ports 99, 100 and 101 as indicated in Fig. 7.

The ports 100 are the high pressure inlet ports and are connected by passage 102 with a passage 103 which as shown in Fig. 1 communicates with an opening 104 for receiving a threaded pipe (not shown) by which a connection is made with the oil pressure system of the engine. As shown in Fig. 9 ports 101 are connected with ports 100, therefore pressure oil will flow through the groove 98 and through a passage 98a into the right end of cylinder 108. The pressure fluid therefore urges a piston 109 connected with rod 63 toward the left. During movement of the piston 109 toward the left into the position shown in Fig. 9 any hydraulic fluid at the left of the piston would be discharged through passages 107, 106 and 105 (Fig. 7) annular groove 96 (Fig. 9) ports 99 and out through the left end valve sleeve 95 and into the chamber 113.

When valve 92 is moved left into the position shown in Fig. 10 by means to be described later so as to connect ports 100 and 99, pressure fluid flows through ports 99 and passages 105, 106 and 107 into the left end of the cylinder 108 and moves the piston 109 toward the right and the hydraulic fluid at the right of the piston 109 flows out of the cylinder 108 through passage 110, groove 98, ports 101 and out the right end of valve sleeve 95 and through pocket 110 which is connected by passage 112 with the chamber 113. Some of this oil may pass through hole 110a with the housing 27.

The bottom of the chamber 113 is drained through a restricted passage 115 (Fig. 9) leading into a pocket 116 which is connected as shown in Fig. 6 with a drain passage 117 located in the plate 24 and provided at its lower end with a pipe-tap 118 for connection with a drain pipe. The vertical passage 117 leads from a short horizontal passage 119 communicating with the upper portion of the chamber 113. During operation of the controller while the engine is running, more oil is discharged into the chamber 113 than can be drained by the passage 115 alone, therefore this oil rises in the chamber 113 to the level of the lower wall of the passage 119, (Fig. 6), thereby substantially filling the chamber 113 with hydraulic fluid.

The left end of cylinder 108 is closed by plug 120. A spring 121 serves to move the piston 109 left into the position shown in Fig. 9 in case of failure of oil pressure. Plug 120 provides a tubular bearing 122 for supporting the piston rod 53 which when moved to the extreme left position is received by the pocket 116. Any leakage of pressure fluid through the part 122 of the plug 120 is drained through pocket 116 and into passage 117 (Fig. 6). To the right of piston 109 the rod 53 passes through a bushing 125 supported by a plug 126 which extends into hole in the plate 26. Any hydraulic fluid that should leak past the bushing 125 is received by the housing 27 which has a restricted drain passage 95a (Fig. 1) connected with a drain 95 in housing 20 and leading to drain 117 in plate 24.

A spring 111 is located in the pocket 110 (Fig. 9) for the purpose of urging the flanged head 131 of sleeve 95 against the shoulder 132 provided by housing 20.

The fulcrum pin 88 of lever 84 is supported by bridge member 140 (Fig. 9) integral with plates 141 and 142 connected, respectively, with flexible metal bellows 143 and 144 which are connected respectively at their outer ends with plates 145 and 146. The space bounded by plates 141 and 145 and the bellows 143 is hermetically sealed and is evacuated so that these members provide an aneroid which compensates for any effect on bellows 144 due to change in atmospheric pressure. Since the bellows 144 is to be responsive to engine fuel intake pressure, the controller provides passages leading into the interior of the bellows 144. These passages include the horizontal passage 150 located in plate 24 and having a threaded end 151 (Fig. 6) for connection with a pipe (not shown) which is connected with the engine intake. Horizontal passage 150 is connected by vertically inclined passage 152 with a pocket 153 in plate 24. Pocket 153 opens into the space within the plate 146 and communicates with the interior of bellows 144 through a hole in a plate 154 serving as a retainer for a spring 156 bearing also against the plate 142. Screws 157 secure plate 146 and a gasket 155 to the plate 24. Springs 158 and 159 are located within the bellows 143 and are confined between the plates 141 and 145. The springs 156, 158 and 159 are so interrelated and calibrated that the movements of pivot pin 88 bear a substantially linear relation to the changes in fuel intake pressure.

An adjustment can be made by changing the position of the plate 145 relative to the fixed plate 146. Fig. 9 shows that the plate 145 has a round boss 145a which is located against a tubular plug 160 threaded into the tubular boss 161 of housing 20. Plug 160 is retained in position by a lock nut 162. A screw 163 passes through a plane hole in plug 160 and is screw-threadedly received by the boss 145a of the plate 145. To change the position of plate 145 relative to plate 146, the screw 163 is loosened and then the nut 162 is loosened to permit turning of the plug 160 by its hex-head 160a. The plug 160 is turned in or out according to the adjustment to be made; and the lock nut 162 is tightened to secure the plug 160 in the desired position. The screw 163 is tightened so as to urge the boss 145a of the plate 145 against the inner end of the plug 160.

Access to the upper portion of chamber 113 in housing 20 is provided through an opening 170 (Fig. 8) closed by plug 171.

The operation of the controller is as follows: First, consider the sequence when the pilot moves the main control lever 31 from 0° to 100° to select the maximum pressure to be maintained in relation to altitude. This movement of lever 31 causes certain parts to move from the normal or rest positions shown in Fig. 9 to the positions shown in Fig. 10. Gear 32 rotates clockwise to drive gear 33 counterclockwise which drives gear 36 counterclockwise $11/20$ of 100° or 55°. The radius of gear 32 is $11/16''$ and the diameter of gear 33 is $7/8''$ and the radius of gear 36 is $20/16''$; therefore the gear ratio is $11/20$ so long as the axis of gear 33 is stationary. As gear 32 moves clockwise, link 44 moves up to the position shown in Fig. 10. In doing so, roller 45 moves in the cam slot 46 and causes an oscillation of plate 35, but this has no effect on the final location of gear 36 because the final location of the axis of gear 33 is the same as shown in Fig. 9. Therefore, for the present the pivotal movement of plate 35 can be disregarded. This 100° movement of lever 31 causes the pressure selector cam 83 to move into the position shown in Fig. 10 and lever 84 moves from normal position in Fig. 9 to the position shown in Fig. 10 thereby causing valve 92 to move left to connect port 100 with passages 99, 106, 107. This causes piston 109 to move right to cause link 44 to move left and plate 35 and axis of gear 33 to rotate counterclockwise and to cause such counterclockwise rotation of throttle lever 41 as required to open the throttle and increase the pressure in bellows 144. The bellows 144 expands and moves lever 84 counterclockwise to cause valve 92 to move right to close ports 99 and 101 thereby causing movement of piston 109 to cease. The piston 109 stops after having moved the throttle into whatever position is necessary to maintain a required pressure in relation to altitude. As altitude increases, the piston 109 moves further toward the right to maintain the pressure. At critical altitude the piston 109 will have moved its full stroke and the gear 33 will have been moved into the position shown in Fig. 11. As gear 33 rolls on gear 32, gear 36 is rotated 17° from the position shown in Fig. 10 to that shown in Fig. 11. (The axis of gear 33 moves 11°. Gear 32 moves $31/20$ of 11° or 17° approximately. The gear ratio is determined by multiplying the angle of roll (11°) of gear 33 by $(1+11/20)$, $11/20$ being the gear ratio between gear 32 and gear 36 when the axis of gear 33 is fixed.) 17° added to 55° brings the total opening movement of the throttle valve to 72° which is the maximum throttle movement for a certain make of engine. It is apparent that when the maximum pressure selection corresponding to maximum (100°) movement of lever 31 has been made, the throttle will have maximum opening at critical altitude.

The determination of the shape of the slot 46 in plate 35 will now be explained with reference to Figs. 12, 13 and 14. If the center line of the slot 46 were a circular arc having a radius equal to the distance between the centers of the pin 47 and the stud 45a, the manually effected movement of link 44 through the action of lever 31, gear 32 and its arm 42 would not cause any movement of plate 35 and hence no orbital movement of gear 33. Let $\theta$ represent the angle of movement of lever 31. Line 1 of Fig. 13 indicates values of $\theta$ in increments of 20°. The corresponding throttle movements for various values of $\theta$ are computed from the equation, throttle movement equals $11/20\ \theta$. These values of throttle movement are given in line 2 of Fig. 13. The line A of Fig. 14 is plotted from the values given in line 2 of Fig. 13. Let $\psi$ represent the angle of movement of plate 35 and of orbital movement of gear 33 when the piston 109 moves the full stroke. The values of $\psi$ for the various positions of lever 31 are determined geometrically as shown by Fig. 12. The various positions of center of pin 42a are indicated by small circles $42a_0$, $42a_{20}$—$42a_{100}$. The various initial positions of link 44 are indicated by lines $44_0$, $44_{20}$—$44_{100}$. The various initial positions of the center of roller 45 are indicated by circles $45_0$, $45_{20}$—$45_{100}$. The final positions of the link 44 are indicated by lines $44'_0$, $44'_{20}$—$44'_{100}$. The final positions of the center of roller 45 are indicated by dots $45'_0$, $45'_{20}$—$45'_{100}$. The values of $\psi$ for various positions of lever 31 (0°–100°) are the angular distances, relative to the center of gear 33, between $45_0$ and $45'_0$, between $45_{20}$ and $45'_{20}$ etc. For example the value of $\psi$, when lever 31 is at 0° is the angle between the lines 0° and 0°'; the value of $\psi$ when lever 31 is at 20° is the angle between lines 20 and 20'. The various values of $\psi$ are given in line 3 of Fig. 13. The corresponding angular movements of gear 36 and the throttle are computed from the formula, angular movement of gear 36 equals $31/20\ \psi$. These values are given in line 4 of Fig. 13. Line 5 shows total throttle movement and the values are computed by adding the corresponding values given in lines 2 and 4 of Fig. 13. The values of line 5 are shown graphically by curve B of Fig. 14. At 0° position of lever 31, the total movement imparted by the controller to the throttle is 76°45' which is in excess of the maximum of 72°. Other values of $\beta$ are less than the maximum. Therefore the shape of cam slot 46 must be such that the total throttle movement will be 72° for every position of lever 31. To determine the shape of cam slot 46, determine the values of $\beta$ give in line 6 of Fig. 13. These values of $\beta$ are the algebraic differences between the 72° and the values given in line 5 of Fig. 13. Next determine the values of angle $\alpha = 20/31\beta$. The approximate values of $\alpha$ are given in line 7 of Fig. 13. Next shift the points $45_0$, $45_{20}$—$45_{100}$ angularly with respect to the center of gear 33 angularly according to the values of $\alpha$. If the algebraic sign of $\alpha$ is plus, shift to the right in Fig. 12, or if minus, shift to the left. The point $45_0$ shifts to $45x_0$ to the left. The point $45_{20}$ shifts right to $45x_{20}$. The point $45_{40}$ shifts right to $45x_{40}$. The point $45_{60}$ shifts right to $45x_{60}$. The point $45_{80}$ shifts to $45x_{80}$. The point $45_{100}$ does not shift. A line joining the points $45x_0$, $45_0$, $45x_{20}$, $45x_{40}$, $45x_{60}$, $45x_{80}$ and $45_{100}$ determines the center line of cam slot 46. The movement of lever 31 into its various positions from 0° to 100° causes movement of gear 33 which are the combined results of the drive by the gear 32 and of the orbital movement of the gear 33 due to movement of plate 35 caused by the movement of roller 45 in the cam slot 46. The manually effected rotation of gear 36 and of the throttle is equal to the sums of the values given in lines 2 and 6 of Fig. 13; and the relation of manually effected throttle opening to movement of lever 31 is represented by curve C of Fig. 14. Manual throttle movement is zero when lever 31 is at 0° position because that portion $45x_0$ to $45_0$ of the center line of the cam slot 46 gives a lost motion of 3° which provides 4° 45′ of lost motion in the movement of gear 36. When the plus values of $\beta$ are added to the values represented by curve B, the totals are all 72° as indicated by line D in Fig. 14. This means that, at critical altitude, the throttle opening is maximum regardless of the pressure selection as determined by the position of lever 31.

The present controller can easily be adapted to meet the requirements of a particular engine by substituting for the disclosed gears 32, 33 and 36, cam slot plate 35 and pressure selecting cam 83, other gears and cams which are designed to meet the specifications of control for that engine.

The engine intake pressure which is selected to be maintained at ground level by moving the lever 31 to a certain position is gradually reduced automatically as the altitude increases. At critical altitude, this reduction amounts to a few percent of the pressure selected by the lever 31. This reduction is commensurate with the reduction in the engine exhaust back pressure as altitude increases. Therefore the engine power output to the propeller will remain substantially constant with altitude variations. This reduction in the manually selected pressure takes place as the axis of shaft 82, carrying pressure selecting cam 83 (Fig. 11), moves counterclockwise around the axis of shaft 69, when the shaft 69 is rotated counterclockwise during movement of piston 109 toward the right, the piston 109 being connected with shaft 69 through piston rod 63, pin 61, levers 59 and 54, link 52, levers 50 and 64, link 66 and lever 68. This feature is described and claimed in the copending Dolza et al. application referred to.

While the embodiment of the present invention as herein disclosed, constitutes a preferred form, it is to be understood that other forms might be adopted, all coming within the scope of the claims which follow.

What is claimed is as follows:

1. A throttle valve controller for supercharged internal combustion engines comprising a control lever and a shaft operated thereby, a throttle valve operating shaft, a sun gear driven by the control lever shaft, a ring gear driving the throttle shaft, an intermediate planet gear meshing with the other gears, a servo-motor having a force applying member for moving the planet gear, said gearing providing for the movements of the throttle shaft by the control lever and by the servo-motor, each movement being independent of the other, means under the control of engine intake pressure for determining the movement of the servo-motor member necessary to position the throttle valve to maintain a selected intake pressure and means operated by the control lever for selecting the intake pressure to be maintained.

2. A throttle valve controller for supercharged internal combustion engines comprising a control lever and a shaft operated thereby, a throttle valve operating shaft, a sun gear driven by the control lever shaft, a ring gear driving the throttle shaft, an intermediate planet gear meshing with the other gears, a servo-motor having a force applying member for moving the planet gear, said gearing providing for the movements of the throttle shaft by the control lever and by the servo-motor, each movement being independent of the other, means under the control of engine intake pressure for determining the movement of the servo-motor member necessary to position the throttle valve to maintain a selected intake pressure, means operated by the control lever for selecting the intake pressure to be maintained, and means under the control of the main control lever for variably transmitting motion from the servo-motor member to the planet gear whereby the servo-motor-effected opening of the throttle valve decreases as the control-lever-effected opening of the throttle valve increases, and vice versa.

3. A throttle valve controller for supercharged internal combustion engines comprising a control lever and a shaft operated thereby, a throttle valve operating shaft, a sun gear driven by the control lever shaft, a ring gear driving the throttle shaft, an intermediate planet gear meshing with the other gears, a servo-motor having a force applying member for moving the planet gear, said gearing providing for the movements of the throttle shaft by the control lever and by the servo-motor, each movement being independent of the other, means under the control of engine intake pressure for determining the movement of the servo-motor member necessary to position the throttle valve to maintain a selected intake pressure, means operated by the control lever for selecting the intake pressure to be maintained, and means for transmitting motion from the servo-motor member to the planet-gear carrying part and including a variable mechanical connection which is adjusted in response to movement of the control lever, the adjustment being such that, as the distance through which the control lever is moved to open the throttle valve increases, there is a decrease in the maximum amount of movement which can be imparted to the throttle valve by the servo-motor, such that the total of the movements which are imparted to the throttle valve by the control lever and by the servo-motor brings the throttle to wide open position at critical altitudes for all selected pressures.

4. A throttle valve controller for supercharged internal combustion engines comprising a control lever and a shaft operated thereby, a throttle valve operating shaft, a sun gear driven by the control lever shaft, a ring gear driving the throttle shaft, an intermediate planet gear meshing with the other gears, a lever carrying the planet gear, a servo-motor having a force applying member for moving said lever, said gearing providing for the movements of the throttle shaft by the control lever and by the servo-motor, each movement being independent of the other, means under the control of engine intake pressure for determining the movement of the servo-motor member necessary to position the throttle valve to maintain a selected intake pressure, means operated by the control member for selecting the intake pressure to be maintained, means for transmitting motion from the servo-motor member to the planet-gear lever and including a slot provided by the planet-gear lever and extending from the pivot thereof, a link operated by the servo-motor member and carrying an element received by the slot and means operating in response to movement of the control lever to move the link-supported element increasing distances from the pivot of the planet gear lever as the control lever moves to increase the opening of the throttle valve, whereby increase in the manually effected opening of the throttle valve results in a decrease in the maximum amount of movement which can be imparted to the throttle valve by the servo-motor, such that the total of the movements which are imparted to the throttle valve by the control lever and by the servo-motor brings the throttle to wide open position at critical altitudes for all selected pressures.

5. A throttle valve controller for supercharged internal combustion engines comprising a control lever and a shaft operated thereby, a throttle valve operating shaft, a sun gear driven by the control lever shaft, a ring gear driving the throttle shaft, an intermediate planet gear meshing with the other gears, a servo-motor having a force applying member for moving the planet gear, said gearing providing for the movements of the throttle shaft by the control lever and by the servo-motor, each movement being independent of the other, means under the control of engine intake pressure for determining the movement of the servo-motor member necessary to position the throttle valve to maintain a selected intake pressure, means operated by the control lever for selecting the intake pressure to be maintained, a lever pivotally supported intermediate its ends coaxially of the control lever shaft and supporting the planet gear on one arm portion, the other arm portion providing a cam slot extending from the lever axis, a link pivotally connected with said servo-motor member and having a cam follower received by the cam slot, means connecting the shaft with the link whereby the cam follower is moved away from the shaft as the sun gear is rotated by the shaft in a direction to increase throttle opening and vice versa, the cam follower cooperating with the cam to effect orbital movement of the planet gear in a direction to effect throttle movement whereby the movement of the throttle valve by the control lever is effected by the driving of the ring gear as the result of orbital and rotary motion of the planet gear and whereby, as the maximum movement which can be imparted to the throttle valve by the servo-motor decreases with movement of the control lever to increase the selected pressure, there is a corresponding increase in the movement of the throttle valve by the control lever such that the total of movements of the throttle valve by the control lever and the servo-motor brings the throttle valve to wide open position at critical altitudes for all selected pressures.

6. A throttle valve controller for supercharged internal combustion engines comprising a control lever and a shaft operated thereby, a throttle valve operating shaft, a sun gear driven by the control lever shaft, a ring gear driving the throttle shaft, an intermediate planet gear meshing with the other gears, a servo-motor having a force applying member for moving the planet gear, said gearing providing for the movements of the throttle shaft by the control lever and by the servo-motor, each movement being independent of the other, means under the control of engine intake pressure for determining the movement of the servo-motor member necessary to position the throttle valve to maintain a selected intake pressure, means operated by the control lever for selecting the intake pressure to be maintained, a lever pivotally supported intermediate its ends upon the control lever shaft and carrying the planet gear on one arm portion, the other arm portion providing a cam slot extending from the shaft, a second lever supported for rotation on an axis parallel to the shaft axis and spaced therefrom, means connecting the servo-motor member with the second lever, a link pivotally connected with the second lever and having a cam follower received by the cam slot, an arm operated by the shaft, a link connecting the arm with first link whereby the cam follower is moved away from the shaft as the sun gear is rotated by the shaft in a direction to increase throttle opening and vice versa, the cam follower cooperating with the cam to effect orbital movement of the planet gear in a direction to effect throttle movement whereby the movement of the throttle valve by the control lever is effected by the driving of the ring gear as the result of orbital and rotary motion of the planet gear and whereby, as the maximum movement which can be imparted to the throttle valve by the servo-motor decreases with movement of the control lever to increase the selected pressure, there is a corresponding increase in the movement of the throttle valve by the control lever such that the total of movements of the throttle valve by the control lever and the servo-motor brings the throttle valve to wide open position at critical altitudes for all selected pressures.

7. Apparatus for controlling the manifold pressure of a supercharged aircraft engine comprising an induction throttle valve which is movable to different positions to directly control the manifold pressure and maintain in the manifold some selected pressure, manually operable means for effecting opening movements of the throttle valve, automatic means movable in response to changes in manifold pressure to cause additional opening movements of the throttle valve, a train of planetary gearing through which both the manual and automatic means effect movement of the throttle, said gearing being so constructed that the total movement of the throttle valve effected in response to operation of the manual and automatic means is such as to bring the throttle valve to wide open position at critical altitude throughout the entire range of pressures which may be selected.

8. Apparatus for controlling the manifold pressure of a supercharged aircraft engine comprising an induction throttle valve which is movable to different positions to directly control the manifold pressure and maintain in the manifold some selected pressure, manually operable means for effecting opening movements of the throttle valve, a servo motor movable in response to changes in manifold pressure to cause additional opening movements of the throttle valve, a train of planetary gearing through which both the manual means and the servo motor effect movement of the throttle, said gearing being so constructed that the total movement of the throttle valve effected in response to operation of the servo motor and manual means is such as to bring the throttle valve to wide open position at critical altitude throughout the entire range of pressures which may be selected.

9. Apparatus for controlling the manifold pressure of a supercharged aircraft engine comprising an induction throttle valve which is movable to different positions to directly control the manifold pressure and maintain in the manifold some selected pressure, manually operable means for effecting opening movements of the throttle valve, automatic means movable in response to changes in manifold pressure to cause additional opening movements of the throttle valve, a train of planetary gearing through which both the manual and automatic means effect movement of the throttle, said gearing being so constructed that the total movement of the throttle valve effected in response to operation of the manual and automatic means is such as to bring the throttle valve to wide open position at critical altitude throughout the entire range of pressures which may be selected and means also actuated by said manual means for selecting the pressure to be maintained.

10. Apparatus for controlling the manifold pressure of a supercharged aircraft engine comprising an induction throttle valve which is movable to different positions to directly control the manifold pressure and maintain in the manifold some selected pressure, manually operable means for effecting opening movements of the throttle valve, automatic means movable in response to changes in manifold pressure to cause additional opening movements of the throttle valve, a train of planetary gearing through which both the manual and automatic means effect movement of the throttle, said planetary gearing and the operating connections between the planetary gearing and the manual and automatic operating mechanism being so constructed and arranged that when the movement of the throttle by the manually operated means is relatively small the movement of the throttle by the automatic means is proportionately large, and vice versa.

11. Apparatus for controlling the manifold pressure of a supercharged aircraft engine comprising an induction throttle valve which is movable to different positions to directly control the manifold pressure and maintain in the manifold some selected pressure, manually operable means for effecting opening movements of the throttle valve, automatic means movable in response to changes in manifold pressure to cause additional opening movements of the throttle valve, a train of planetary gearing through which both the manual and automatic means effect movement of the throttle, said planetary gearing and the operating connections between the planetary gearing and the manual and automatic operating mechanism being so constructed and arranged that when the movement of the throttle by the manually operated means is relatively small the movement of the throttle by the automatic means is proportionately large, and vice versa, and means whereby the total movement of the throttle effected by both the manual and automatic means is always sufficient to bring the throttle valve to wide open position at critical altitude, irrespective of the proportions of such total movement effected by the manual and automatic means.

CLARENCE H. JORGENSEN.
LAWRENCE C. DERMOND.

REFERENCES CITED

The following references are of record in the file of this patent:

UNITED STATES PATENTS

| Number | Name | Date |
|---|---|---|
| 2,168,958 | Lichtenstein | Aug. 8, 1939 |
| 2,243,627 | Gregg | May 27, 1941 |
| 2,284,687 | Schimanek | June 2, 1942 |
| 2,233,319 | Lozivit | Feb. 25, 1941 |

FOREIGN PATENTS

| Number | Country | Date |
|---|---|---|
| 356,619 | England | Sept. 10, 1931 |